July 15, 1969  R. B. DOWNEY  3,455,222
PHOTOGRAPHIC APPARATUS
Filed Dec. 29, 1966  5 Sheets-Sheet 1

INVENTOR.
Rogers B. Downey
BY
Brown and Mikulka
ATTORNEYS

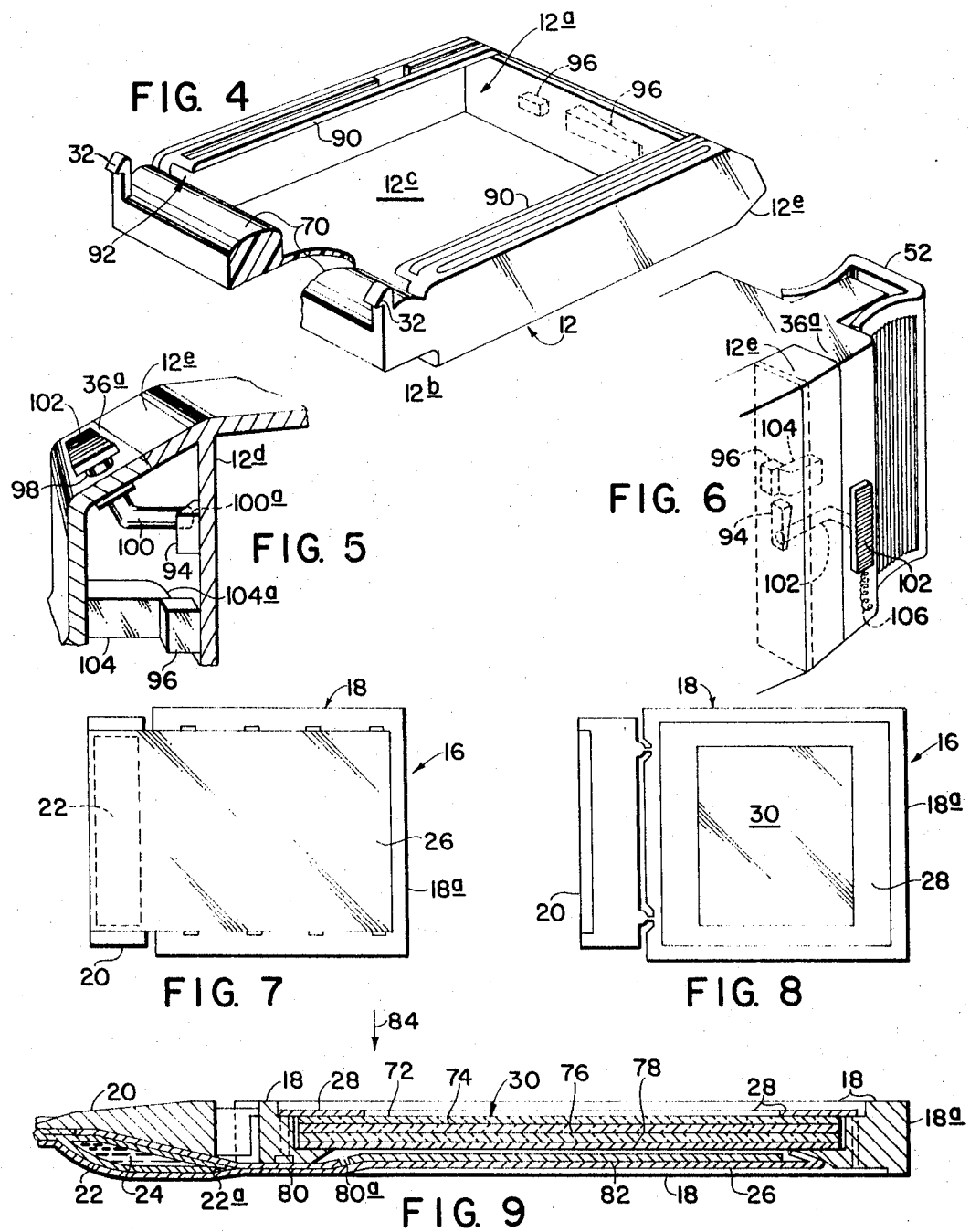

July 15, 1969  R. B. DOWNEY  3,455,222
PHOTOGRAPHIC APPARATUS
Filed Dec. 29, 1966  5 Sheets-Sheet 3

INVENTOR.
Rogers B. Downey
BY
Brown and Mikulka
ATTORNEYS

United States Patent Office 3,455,222
Patented July 15, 1969

3,455,222
PHOTOGRAPHIC APPARATUS
Rogers B. Downey, Lexington, Mass., assignor to Polaroid Corporation, Cambridge, Mass., a corporation of Delaware
Filed Dec. 29, 1966, Ser. No. 605,650
Int. Cl. G03b 17/52
U.S. Cl. 95—13
19 Claims

ABSTRACT OF THE DISCLOSURE

A film magazine for incorporation with a camera for use in supplying, exposing and processing a film pack, composed of a plurality of composite film units, each embodying a releasably-contained processing liquid. The outer wall of the magazine is so contoured as to form the rear face of the camera when attached thereto. Adjacent the film exit aperture in the magazine are a pair of compressive means, one of which is stationary and integral with the magazine. The abutting compressive means is a rotationally and translationally movable roller which may be integral with the magazine or mounted on the camera body. Either or both of the compressive means are formed of a disposable material to offset the wear which occurs during advancement of the film units therebetween.

CROSS-REFERENCES TO RELATED APPLICATIONS

The present application is broadly directed toward apparatus for effecting an improvement in the operation of spreading a releasably-contained processing liquid carried within a composite film assembly, the latter, for example, being of a category such as that shown in the copending U.S. patent application, Ser. No. 516,494, filed Dec. 27, 1965 under the name of Rogers B. Downey for "Photographic Film Assembly" or the film unit described in U.S. Patent No. 3,080,805. The present application also relates generally to camera apparatus of the type disclosed in the copending U.S. patent application Ser. No. 604,050, now Patent No. 3,437,024, filed Dec. 22, 1966 under the names of Rogers B. Downey and Allyn M. Silverman for "Camera Apparatus," as well as to commercial cameras of a conventional type, such as the so-called "100" series sold by Polaroid Corporation, Cambridge, Mass.

BACKGROUND OF THE INVENTION (1) The field to which the present invention chiefly relates is that of supplying and compressively processing in a camera a plurality of film assemblies or units, each of which embodies a processing liquid. The field is that largely associated with and restricted to products and processes of Polaroid Corporation, above referenced.

A film assembly of the character described includes photosensitive and image-providing components and a processing liquid releasably contained in a compressible and frangible container component. It is of a multilayer structure such that, after exposure, release of the liquid by the application of a compressive force to the containing component thereof and imbibition of the liquid into predetermined layers, including an exposed silver halide emulsion layer, provide a visible image. The image is formed by the diffusion transfer of image-forming substances to a designated image-receiving surface. A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxymethyl cellulose and, possible, a high-molecular-weight polymeric mordant to facilitate the transfer process. In producing a black-and-white image, a latent image is developed; the exposed silver halide is reduced to silver, and the unreduced silver halide forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer process. Or, a black-and-white image in conjunction with a color screen may, advantageously, be employed to provide an image visible substantially in full color.

(2) Certain prior art, which may be considered of interest and relative to which the present invention constitutes an improvement or alternate approach of commercial worth includes structures shown in the following U.S. Patents: 2,495,111, 2,681,602, 2,837,987, 2,880,660, 3,165,039, 3,241,468 and 3,283,682. Problems associated with the prior art include, for example, (a) those involving compressive elements which do not efficiently or consistently provide spreading of a processing liquid between the significant layers of the film assembly thereby permitting the formation of pockets or gaps in the liquid layer and blemishes in the completed photographic print; (b) wear and fouling of the compressive surfaces; (c) structures which, by reason of bulk or complexity are unsuited to embodiment in a camera; (d) unduly expensive constructions of the film holder and compressive means or mechanism, and other difficulties which will be mentioned hereinafter.

SUMMARY OF THE INVENTION

The present invention overcomes the problems outlined, above, relative to the prior art in various respects comprising the following:

(a) By providing compressive means of an improved structure for achieving a more efficient and even spreading of the processing liquid and a lessening or elimination of trapped air therewithin with an attendant elimination of bubbles and ensuing print blemishes.

(b) By providing a magazine embodying compressive means which magazine is so releasably attachable to the camera that the compressive means are automatically positioned correctly with respect to one another.

(c) By incorporating one compressive element with a disposable magazine mounted on the camera and a second compressive element, including permanent biasing means therefor, with the camera, per se.

(d) By incorporating both compressive elements with a disposable magazine and permanent biasing means therefor with the camera.

(e) By providing one or a pair of disposable compressive means with permanent biasing means therefor incorporated with the camera.

(f) By providing improved surface contours of compressive means to achieve a more efficient spreading of a processing liquid and to practically eliminate damaging trapped air.

(g) By providing, through the disposable feature, a solution to the problems of both wear and fouling of the compressive elements. Complete replacement of units insures continuously "fresh" unimpaired contacting surfaces.

(h) By providing disposable film supply and compressive structures such as may be formed consistently by an injection molding process.

Objects of the invention are, accordingly those associated with each of the provisions set forth under (a)

through (h), above. Other objects will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings.

BRIEF DESCRIPTION OF THE DRAWINGS

FIG. 4 is a diagrammatic perspective view of a disposable magazine embodying associated compressive means;

FIG. 5 is an enlarged diagrammatic fragmentary top view of movable latching means for releasably attaching the magazine to the camera;

FIG. 6 is a diagrammatic fragmentary rear view, in section, of the latching means of FIG. 5;

FIG. 7 is a diagrammatic rear view of a film assembly or unit of a miniature type used with the camera of FIG. 1;

FIG. 8 is a front view of the film unit of FIG. 5;

FIG. 9 is an enlarged diagrammatic elevation view, in cross-section, of the film unit of FIGS. 6 and 7;

DESCRIPTION OF THE PREFERRED EMBODIMENTS

Figure 1:
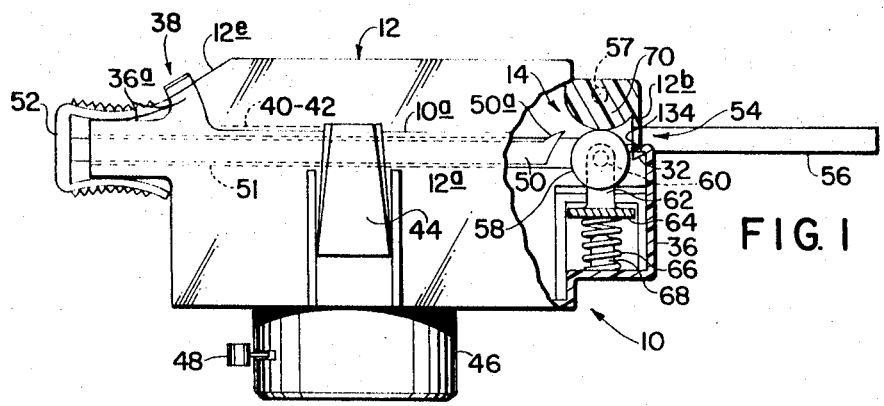
FIGURE 1 is a diagrammatic top view, partly in section, of a camera of a miniature type illustrating one embodiment of a disposable or "throw-away" type of magazine and compressive means of the invention.

Referring to the drawings, a miniature camera 10 is illustrated from the top in FIGURE 1, partly in section. Incorporated therewith is a film container or magazine 12 and compressive means 14, of special structure in accordance with requirements of the invention. The camera, exclusive of the magazine, compressive means, and a slight modification of the housing is generally similar to that shown in the above-referenced U.S. patent application Ser. No. 604,051, now Patent No. 3,437,024.

A miniature type of film assembly or unit 16 for use therewith is shown in the rear and front views thereof of FIGS. 7 and 8, respectively, and in the sectional view of FIG. 9. The film unit includes a rigid mount 18, preferably formed of a plastic material, a unitary break-off tab 20, a compressible frangible container or pod 22 releasably-carrying a processing liquid 24, a cover sheet 26 attached at one end to the break-off tab, a mask or frame 28 and a composite film component 30. It will be noted that the film component 30 is uncovered at its front face, but is covered by the sheet 24 at its rear face. The film unit structure will be further described below, in relation to the processing operation.

The substantially open face or front 12a of the magazine 12 is removably attached to the camera 10 at an open rear face 10a of the latter by the hooked members 32 projecting from one side of the magazine which are adapted to be inserted in the pair of apertures or recesses 34 formed in the camera housing 36 so as to engage underlying surfaces thereof and by a latching mechanism 38 at an opposite side, shown in detail in FIGS. 5 and 6. A light-tight relationship of camera and magazine is provided by the stepped-flange structure 40 and 42 of mating surfaces of each. The magazine 12 is of a disposable or "throw-away" type and is to be discarded upon exhaustion of its complement of film units. It is composed, for example, of a plastic material such as that known as "Acrylafil" sold by Fiberfil, Inc., Evansville, Ind. Another plastic material for the purpose is "Delrin" sold by E. I. du Pont de Nemours Co., Wilmington, Del. The magazine is adapted to hold a film pack comprising a plurality of film units, in stacked relation, the foremost film unit and those underlying it being so positioned in the magazine that the front of each film unit, as shown in FIG. 8, faces outwardly of the substantially open face 12a of the magazine. The terms "front" and "rear," "forwardly" and "rearwardly," etc., as used herein, refer to proximity or remoteness of the parts mentioned to the front of the camera, when associated therewith.

Figure 3:
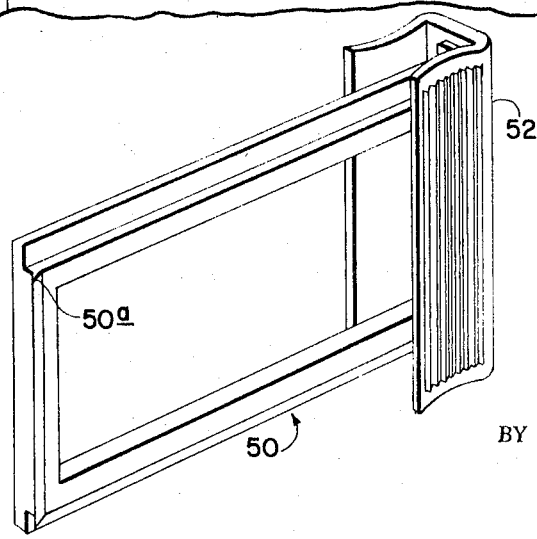
FIG. 3 is a diagrammatic perspective view of an element of the camera of FIGURE 1 for advancing, i.e., pushing, each film assembly from an exposure location at a focal plane, between the compressive means and through an exit aperture at one end of the camera housing into a semi-enclosing processing chamber.

Further referring to FIGURE 1, the camera includes a finder 44, a lens-shutter-and-diaphragm assembly 46, shutter-release means 48, a film-advancing member or "pusher" 50 slidably-mounted in channel means 51 of the camera and adapted to horizontal movement across the open face 10a of the latter and the aligned open face 12a of the attached magazine. The film-advancing member 50, more clearly shown in FIG. 3, includes a leading rearwardly-angled component 50a for contacting the trailing edge 18a of the film mount. The member 50 has a handle 52 fixedly attached to an end portion thereof which extends through an appendage 36a of the camera housing, as permitted by an extension of the channel 51 therethrough. It will be noted that the magazine, when installed as shown in FIGURE 1, effectively forms a continuous external element or portion of the camera housing. At that end of the combined camera and magazine at which the compressive means 14 are located, an exit slot 54 is formed in the end-wall of the magazine permitting passage of a film unit therethrough. Thence, the film unit passes into a semi-enclosing processing chamber 56 which provides light shielding of the front surface thereof and a holding function. The film unit remains in the chamber 56 for the few seconds necessary for completion of its processing. The processing chamber is of a pivotal type, that is, it is pivotally attached to the camera housing at 57 and adapted to be folded against the rear surface of the magazine 12 when not in use. Such a processing chamber is more fully shown in the copending U.S. patent application Ser. No. 516,415 filed Dec. 27, 1965 under the name of Rogers B. Downey. It is not essential to the present invention, however, that the processing chamber be of a pivotal type, as long as a protective environment relative to ambient light is provided the film unit. However, the pivotal chamber shown constitutes a preferred example.

Figure 10:
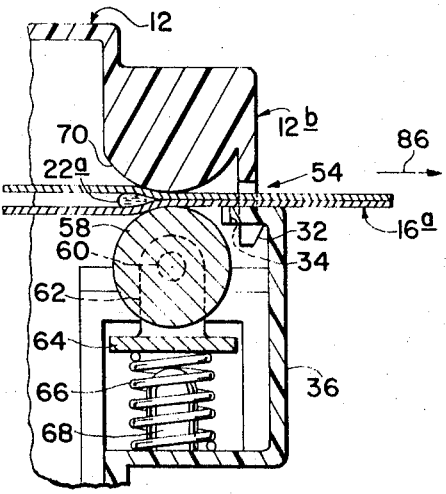
FIG. 10 is a diagrammatic fragmentary elevation view of compressive means of the invention, also illustrating the operation of spreading a processing liquid.

The compressive means 14, shown in enlarged form in FIG. 10, comprises, as a first compression element thereof an elongated pressure roll 58, pivotally mounted by a pair of stub shafts 60 on a pair of end supports 62. The latter terminate forwardly of the camera in a transverse interconnecting plate element 64. A pair of compression springs 66 is positioned between the plate 64 and the camera housing 36. The plate 64 is adapted to move forwardly and rearwardly in suitable guide means 65 at its extremities. The pressure roll 58 is thus adapted to undergo translational movement in conjunction with compression or extension of the biasing springs 66. If desired the ends of the springs 66 may be recessed within the plate 64 to relieve complete dependence upon the guide means 65. A pair of circular pins 68, projecting rearwardly from the housing 36, serves to guide movement of the spring coils and further facilitates a linear bodily movement of the pressure rolls. The second compression element of compressive means 14 is a fixed component 70, integral with an extended portion 12b of the magazine. It will be noted that the radius of curvature of the film-contacting surface of the element 70 is greater than that of the pressure roll. The combination of the fixed compressive member 70 with the rotatable pressure roll is to prevent scratching of the surface of the film 30, the pressure roll being the element in contact therewith. However, the second compressive member may also be fixed, as shown hereinafter, and composed of a softer plastic or one coated or impregnated with a silicone or the like to prevent scratching of the film component.

A film unit 16, adapted when exposed and processed to produce a finished slide or transparency suitable for projection, is illustrated in detail in FIG. 9, the unit, of course, being of greatly exaggerated thickness. In addition to components thereof previously described, it includes a transparent base layer 72, a transparent additive color-screen layer 74 comprising a plurality of color components, a transparent image-carrying or receiving layer 76, a photosensitive silver-halide emulsion 78, an apron or bib 80, and an opaque stripping layer 82. The photographic exposure of the emulsion occurs in the direction of the arrow 84, that is, through the transparent layers 72, 74 and 76.

Figure 11:
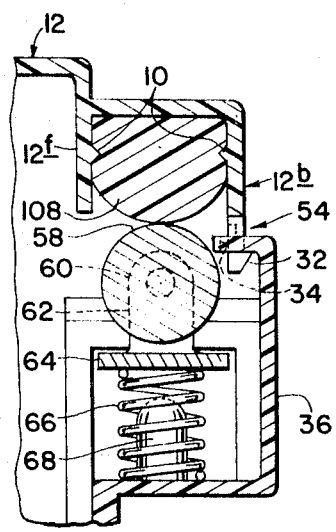
FIG. 11 is a diagrammatic fragmentary end-view of disposable compressive means, releasably mounted in a camera.

After the exposure, the film unit is advanced between the compressive means in a direction to the right relative to the compressive means shown in FIGS. 1, 10 and 11, the tab 20 and compressible liquid container 22 first entering the bite of the compressive members. Upon compression of the container 22, the processing liquid 24 is emitted between the separable or frangible sealed container edges 22a, passes between the cover sheet 26 and bib 80, through the gap at 80a, and between the emulsion 78 and stripping sheet 82. The processing liquid permeates the emulsion layer and the image is formed by diffusion transfer in a layer of the solidified processing liquid formed on the layer 76, or on the layer 76 per se, or in part in the solidified liquid and in part in layer 76. During the few seconds required to complete imbibition of the processing liquid and completion of the image transfer, the film unit, having passed through the exit aperture 54, is held firmly in the chamber 56. The tab 20 is then manually broken off, the cover sheet 26, stripping layer 82 and emulsion 78 adhering thereto and to one another and being stripped away as a unit. With these components removed, the assembly is essentially ready for direct viewing or projection, the image being formed in black-and-white and the color screen 74, which had previously served a color-separation function in the taking or exposure step, now providing a visible full-color image rendition. As previously intimated, the apparatus of the invention is also adapted to operation in conjunction with diffusion transfer processes and film units of modified structure wherein, for example, the ultimate colors of the image are produced by dye-image-forming substances, such as complete dyes, color couplers or the like. Or, the film unit and process may involve merely the formation of a black-and-white image.

Spreading of the processing liquid 22 between the appropriate layers of a composite film assembly is shown, diagrammatically, in FIG. 10. For purposes of illustration, the structure of a film assembly 16a has been simplified in this instance, the purpose being merely to indicate the meniscus form 22a of the flowing liquid as the film unit is advanced in the direction of the arrow 86. This representation of film material and meniscus form is intended to apply as well to various film structures wherein a processing liquid is releasably contained between a pair of layers thereof and not to be limited to a particular film structure.

Certain considerations relating to the liquid spreading operation to which the compressive means of the present invention are specifically pointed comprise the following Where the compressive means have a large radius of curvature or where they have substantially no curvature at all except a very gentle curvature at entrance portions for receiving the film unit or at entrance and exit portions, the thickness of the liquid adjacent to the meniscus portion 22a, that is, the vertical dimension thereof in FIG. 10, is appreciably less than it is when compression is provided by a pair of pressure rolls of a diameter suitable for inclusion in a camera of reasonably small dimensions. To reduce the thickness of the meniscus portion by providing a longer entrance angle for the film unit is highly desirable because, in so doing, the leading meniscus-shaped surface is reduced in area to a minimum and there is relatively little opportunity for an exposure to and entrapment of air by the liquid. Also, the leading surface of the liquid is placed farther away from the bite of the compressive means, thus permitting a greater opportunity for dissipation of any entrapped air than would be the case where a relatively small radius-of-curvature of compressive member is present, as in the customary rotatable stainless steel pressure rolls of conventional cameras now sold by Polaroid Corporation.

Figure 2:
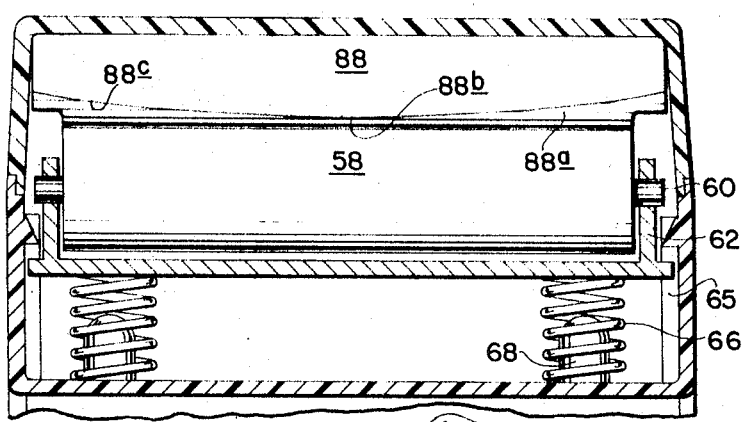
FIG. 2 is an end elevation view, partly in section taken along the line 2—2 of FIGURE 1 and further illustrating the compressive means thereof.

By forming the compressive means, at least in part, of a suitable plastic material, as by an injection-molding process, it becomes easily possible to attain, in compressive elements of small size and adapted to incorporation in a compact camera, inlet surface shapes akin to those of a pressure roll of very large diameter. It also becomes possible to provide varied shapes of the compressive means longitudinally thereof for further enhancing the spreading operation. One such modified shape is shown in FIG. 2 wherein the fixed compressive element 88 includes recessed portions 88a which continuously deepen or widen from the center 88b toward the extremities 88c. This structure serves to influence a flow of the processing liquid, which ordinarily would tend to concentrate at central film-unit portions, toward the longitudinal margins thereof, thus facilitating an even distribution and uniform thickness of the liquid layer. While the structure of FIG. 2 indicates the combination of the element 88 with a pressure-roll 58 to constitute the compressive means, it is to be understood, as previously intimated, that element 88 can be combined with other means of the invention, such as a fixed compressive element thereof to provide the combined means.

Other factors which favor a plastic composition of the compressive means thereof, in addition to the more efficient compressive curvatures and other shapes which are readily possible, include a low cost which bears upon the practicability of their being of a discardable or "throwaway" type, alone, or in conjunction with a disposable magazine formed of a similar inexpensive plastic material and with which they may advantageously be in part of wholly unitary. Assuming an injection molding method of forming the compressive means and magazine, an identical perfect contour of the compressive surfaces can always be assured, thus providing a more consistent satisfactory performance of all cameras in which they are incorporated. Again the plastic structure, being much lighter than that of metallic pressure rolls, contributes to a desirable overall light weight of the camera. A reduction in bulk over a camera employing the customary steel pressure rolls is also possible.

Assuming a disposable plastic compressive means to be employed, the aforesaid shape, weight, bulk, and quality control advantages are obtained and no problem of wear with respect to the film-contacting surfaces occurs because the compressive elements are discharded as soon as the film-unit complement of the magazine, e.g., eight to ten film units, is used up. In this connection, it is to be considered that wear may become noticeable in permanent steel pressure-rolls and a comparative advantage of the plastic compressive means of the invention thus exists from the aspect of wear as well as those of shape, weight, etc. The throw-away feature of the plastic compressive means also constitutes a minimization of the possible fouling of the compressive elements, a hazard to efficient operation occasionally met within conventional self-processing cameras employing steel pressure-rolls. Where the processing liquid inadvertently comes in contact with the pressure rolls, for some unforseen reason, and remains in a fluid state or hardens, efficient compression thereafter is not possible until the rolls are thoroughly cleaned. By assuming a regular pattern or cycle of discarding the compressive means, for example, with the disposable magazine after the exhaustion of each film pack provided in the latter, the chance of having fouled compressive surfaces is automatically reduced.

The magazine 12, composed of a polystyrene or another of the plastic materials previously mentioned, is provided with a film pack composed of a plurality of the film units e.g., eight to ten such units loaded therein. The film pack is biased toward the essentially open face 12a thereof as previously intimated, by any suitable biasing means such as a spring bearing, respectively, against the closed rear wall 12b and the rear surface of the film pack or a "paddle" element actuated by a complementary contacting component of the camera, not shown. A pair of turned-over flanges 90 constituting a guide means serves both to hold the foremost unit of the film pack against a forward release therefrom through the open face 12a and to control its lateral movement during removal by the pusher 50. In undergoing such removal, the film unit passes through the opening or exit aperture 92 provided at the extremities of the guide means 90 across the compressive means 70 and between the hooked members 32. As supplied, an opaque slide (not shown), composed of a plastic, a cardboard or the like, is slidably mounted in the guides 90 to provide a light-tight cover for the magazine. This cover is removed by the pusher 50 as a preliminary step when the magazine is mounted on the camera. The foremost film unit is then uncovered and ready for photographic exposure. The fixed compressive element 70 is preferably composed of a plastic material similar to that of the magazine, such as a polystyrene or another of the plastics previously mentioned, and is integral therewith.

The side or end-wall 12d of the magazine is flexible. It includes an integral laterally-extending and tapering camming element or ramp 94 and, generally in-line therewith, a projecting flange or lip 96. An angled portion 36a of the camera housing is adapted to mate, endwise, with a similarly-angled portion 12e of the magazine housing which slightly overhangs the end-wall 12d. The angled housing portion 36a includes an elongated slot 98 formed therein. A right-angled arm 100 is mounted for slidable movement along the slot, one end of the arm terminating in an actuating button 102 and the other extremity 100a of the arm contacting and being adapted to undergo slidable movement along the ramp 94. A small flange or lip 104 having a tapered or bevelled receiving surface 104a which the lip 96 of the magazine is adapted to pass over or push aside and then underlie in a "snap" operation serves to hold the magazine and camera in latched relation when the magazine is hooked at one end in the recesses 34 and pressed against the camera at the other or latching end. The arm 100 is normally held at one extremity of the slot 98 by an extension spring 106, at which position the "snap" or engaging operation of the two flanges 96 and 104 takes place.

To release the magazine, the button 102 is pushed linearly thereby moving the integral arm 100 along the slot 98 in a direction which causes movement of the tip 100a of the arm along the surface of the ramp 94, that is, from the thinner or lower portion of the ramp to its thicker or upper portion. This forces the flexible magazine wall 12d inwardly. Accordingly, the flange 96 is moved translationally away from the location of its engagement by the flange 104, the magazine thereby being unlatched at one end and adapted to be unhooked at the other end by releasing the hooked members 32 from the apertures 34. It has been stated that the engaging operations of hooking and latching the magazine onto the camera automatically provide a correct alignment of the compressive elements 58 and 70. It is further to be understood that these operations automatically provide a correct biasing compression of the springs 66.

In FIG. 11, there is shown a modification of the compressive means wherein a disposable and replaceable fixed compressive element 108 is illustrated. The element 108 is insertable endwise in retaining portions 12a and 12f of the magazine and is removable by drawing it endwise therefrom. Guide means 110 insure a correct position of the compressive surface. In this example, it is reasonably to be assumed that the magazine is of a relatively permanent or semi-permanent type, the compressive means being replaceable at least prior to that of the magazine.

Figure 12:
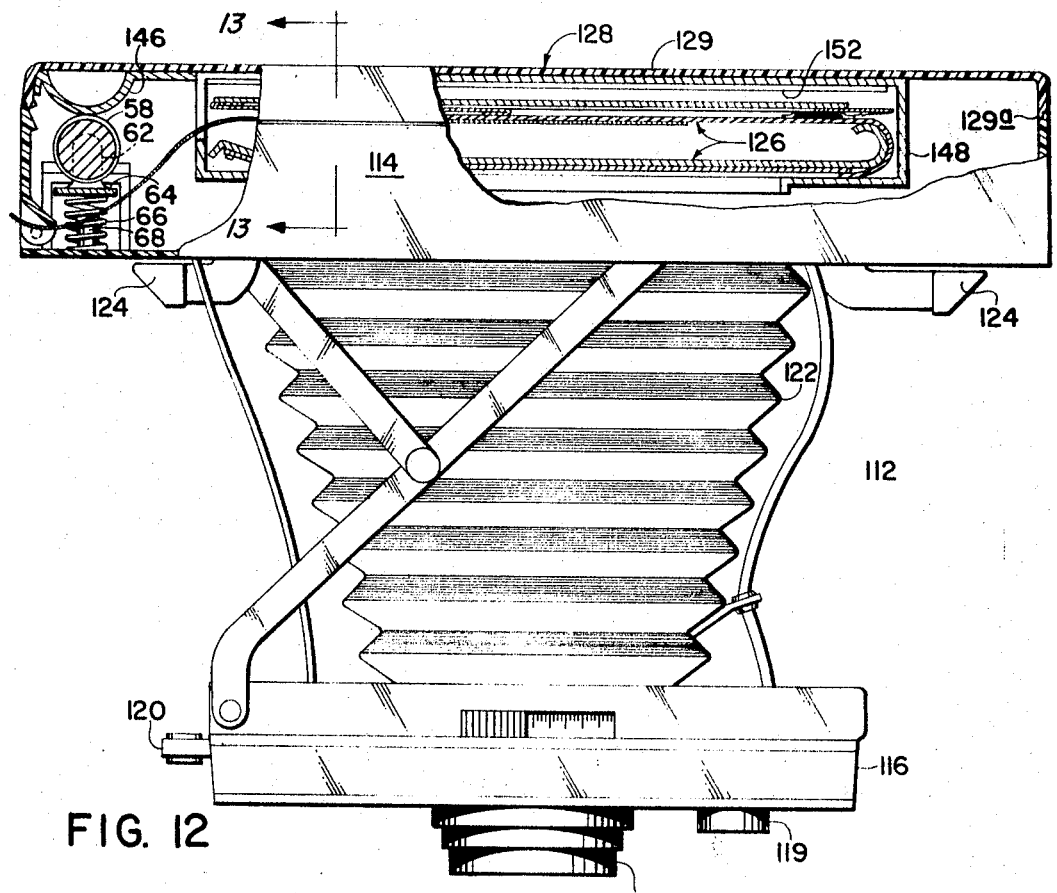
FIG. 12 is a diagrammatic side view, partly in section, of another type of camera incorporating a disposable magazine and associated compressive means.
Figure 13:
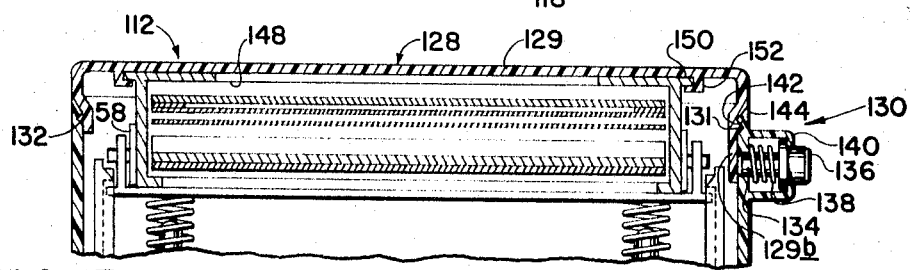
FIG. 13 is an enlarged diagrammatic, sectional end view of the compressive means of FIG. 12.

An adaptation of the disposable magazine and compressive means of the present invention to a camera 112 of a type comprised by the "100" and "200" series of cameras currently sold by Polaroid Corporation is illustrated in FIGS. 12 and 13. Cameras of this category generally include a camera back 114, an extensible camera front 116, a lens-shutter-diaphragm assembly 118, a photoelectric-exposure-control element 119, a shutter release 120, a bellows 122, and laterally movable distance-adjusting means 124. A film assembly 126 of a conventional type employed in such a camera is shown mounted for photographic exposure therein. The conventional camera back has been supplanted by structure comprising magazine and compressive means of the present invention. A magazine 128 including an outer housing 129 is releasably attached to the camera back 114 by the stepped housing portions 129a and by latching means 130, shown in the sectional end-view of FIG. 13, which includes the detents 131 and 132, the flexible magazine housing sidewall 129b and the magazine release means 132 comprising a shaft 134, an actuating button 136 affixed to an end of the shaft, a compression spring 138 for retracting the shaft and button, and the mounting bracket 140. The magazine release means operates to press the side-wall inwardly thereby to release the detent 130 from a complementary recess 142 formed in an overlapping wall-member 144 of the camera back. A rotatable pressure-roll 58 mounted in the camera back and a fixed member 146 of the general type previously described and identified with the magazine constitute the compressive means. It is to be understood that a pair of non-rotatable compressive means of the general type shown elsewhere herein could also be utilized in this camera.

In FIG. 13 it will be noted that an internal section or chamber 148 holding the film material 126 is releasably attached to the magazine housing 129 by the flanged portions 150 of the section 148 which are slidably inserted in the bracket member 152 disposed inwardly from the housing 129. The entire magazine 128, including the inner section 148 and the fixed compressive member 146 may be considered as composed of a plastic material and disposable. Alternatively, only the removable inner section 148 and integral fixed compressive member 146 may be considered as of a disposable category. Either of these constructions would thus comprehend an integral disposable magazine and compressive means.

Figure 14:
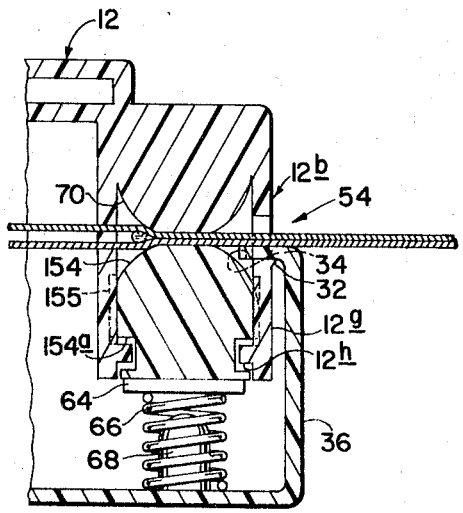
FIG. 14 is a diagrammatic, fragmentary, side-elevation view of a modification of disposable unitary magazine and compressive means.
Figure 15:
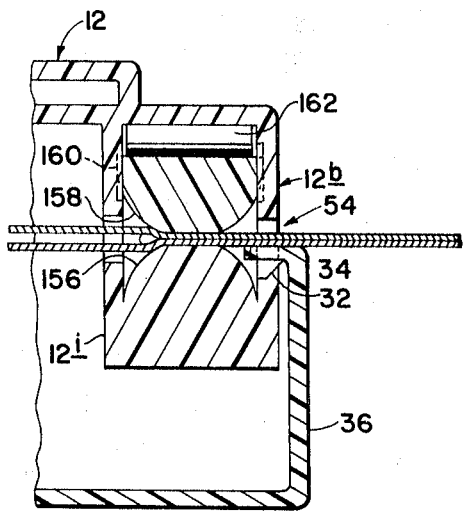
FIG. 15 is a diagrammatic, fragmentary, side-elevation view of a further modification of the magazine and compressive means.

FIGS. 14 and 15 illustrate further modifications of the compressive means which are primarily identified with the camera of FIGURE 1 but which, in principle, could conceivably be incorporated with the camera of FIG. 12, only minor mounting changes being necessary in the latter instance. The structure of FIG. 14 comprises portions of the acmera, magazine and compressive means, previously described and similarly numbered. Additionally, it includes the elongated compressive member 154, slidably mounted for back-and-forth movement in recessed channels 155 of the extended portions 12g of the magazine, the limits of such movement being determined by the projecting flanges 12h and the slots 154a within which they are positioned. The movable compressive member 154 is biased toward the fixed compressive member 70 by the compression spring 66, identified with the camera and previously described. The magazine and the compressive members 70 and 154 are to be considered as formed of a plastic material, of a type above-mentioned, and to be disposable as a unit.

The modification of FIG. 15 includes certain structure previously described. In addition, it comprises an appendage 12i of the magazine, a fixed compressive member 156 integral therewith, a movable compressive member 158, slidably mounted for back-and-forth travel in recessed channels 160, and a flat comperssion spring 162 bearing, respectively, against the magazine housing portion 12a and the compressive member 158 so as to bias member 158 toward the fixed compressive member 156. The biasing spring 162 may be slidably removed, endwise, or otherwise actuated for relieving the compressive member 158 of its compressive force. Again, the magazine and both compressive members may be considered as composed of a plastic material and to be disposable, for instance, after the magazine has become exhausted of its complement of film units.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for incorporation with a camera for use in supplying, exposing and processing a film pack composed of a plurality of composite film units each embodying a releasably-contained processing liquid, said apparatus comprising a film magazine having a substantially open front face removably attachable at opposite side walls to an invariably open rear face of said camera leading forwardly to lens means thereof for providing a complete closure thereof, and for supplying said film units, positioning them at a focal plane, and enabling their advancement therefrom for processing purposes, said magazine having an outer wall so contoured as to form a continous extension of an outer wall of said camera when mounted on said open rear face and including means for urging said film units forwardly therewithin toward said focal plane, guide means extending along a pair of edges at said front face and terminating laterally in an exit aperture for permitting slidable removal of each foremost film unit therefrom, a pair of elongated compressive means located adjacent to said exit aperture, one of which is fixed against both rotational and translational movement and the other of which is at least translationally movable, said compressive means being adapted to extend transversely across and compress said film units, at least said fixed compressive means being mounted for ready removal and discard after a given period of use to minimize wear during advancement of said film units therebetween and remedy possible fouling by any escape of said processing liquid, biasing means adapted to bear against said translationally movable compressive means and urge it toward said fixed compressive means, and complementary positioning and latching means mounted for mutual engagement on said magazine and camera for holding each in removable engagement with the other.

2. Photographic apparatus, as defined in claim 1, wherein said disposable compressive means is composed of a pre-formed plastic composition.

3. Photographic apparatus, as defined in claim 1, wherein said magazine and at least said fixed compressive means are unitary and formed of a disposable material.

4. Photographic apparatus, as defined in claim 3, wherein said magazine and said fixed compressive means are composed of a plastic material.

5. Photographic apparatus, as defined in claim 3, wherein said translationally movable compressive means and said biasing means are components of said camera.

6. Photographic apparatus, as defined in claim 5, wherein said translationally movable compressive means is a rotatable pressure roll and said biasing means is a compression spring bearing against movable mounting means therefor.

7. Photographic apparatus, as defined in claim 6, wherein said fixed compressive means has a radius of curvature which is greater than that of said pressure roll.

8. Photographic apparatus, as defined in claim 1, wherein said magazine and said fixed compressive means are integral, wherein said translationally-movable compressive means is mounted on said magazine, and wherein said magazine and both said compressive means are formed of a disposable material.

9. Photographic apparatus, as defined in claim 1, wherein said magazine and said open face of said camera are rectangular, and wherein said magazine is held in correct engagement with said camera by interlocking hook and recess means, respectively, located at one pair of facing surfaces thereof, by manually-actuatable latching means located at an opposite pair of facing surfaces, and by light-tight mating surfaces of said magazine and camera intervening between said interlocking and latching means.

10. Photographic apparatus, as defined in claim 9, wherein said compressive means have predominantly flat functional surfaces.

11. Photographic apparatus, as defined in claim 9, wherein said latching means is in the form of a pair of interlocking flanges, camming means associated with one of said flanges, and manually-operable means for actuating said camming means to release one of said flanges from locking relation with the other.

12. Photographic apparatus for incorporation with a camera for use in supplying, exposing and processing a quantity of composite film material embodying a releasably-contained processing liquid, said apparatus comprising a film container having an exit aperture formed at one end thereof and removably attachable to normally open rear portions of said camera for providing a closure thereof, and for supplying said film material, positioning it at a focal plane and enabling its advancement therefrom laterally through said aperture for processing purposes, said container when attached to said camera forming an effectively-integral continuous outer housing portion of the latter, a pair of compressive means one of which is fixed against any movement and the other of which is translationally movable for releasing and spreading said processing liquid, said fixed compressive means being mounted on said container and said translationally movable compressive means being mounted on one of said container and camera adjacent to said aperture thereof, at least one of said container per se and compressive means mounted thereon being disposable and periodically replaceable for minimizing wear and fouling of said compressive means, biasing means mounted on said camera for urging said movable compressive means toward said fixed compressive means, and complementary interconnecting positioning and latching means mounted in part on said container and in part on said camera for holding each in removable engagement with the other.

13. Photographic apparatus, as defined in claim 12 wherein said container, when attached to said camera forms an integral portion of the housing of said camera.

14. Photographic apparatus, as defined in claim 12, wherein said container is mounted within a rear chamber of said camera having access means thereinto.

15. Photographic apparatus, as defined in claim 1, wherein each of said film units is in the form of an individually mounted unit and wherein said camera includes manually-actuatable means for engaging and advancing said film units from an exposure aperture, between said compressive means, through an exit aperture formed in an end of said camera, and into a processing chamber attached thereto.

16. Photographic apparatus for incorporation with a camera for use in supplying, exposing and processing a film pack composed of a plurality of composite film units each embodying a releasably-contained processing liquid, said apparatus comprising a film magazine having a substantially open front face removably attachable at opposite side walls to an open rear face of said camera for supplying said film units, positioning them at a focal plane, and enabling their advancement therefrom for processing purposes, said magazine including means for urging said film units forwardly therewith toward said focal plane, guide means extending along a pair of edges at said front face and terminating laterally in an exit aperture for permitting slidable removal of each foremost film unit therefrom, a pair of elongated compressive means located adjacent to said exit aperture, one of which is fixed and the other translationally movable, said compressive means being adapted to extend transversely across and compress said film units, at least said fixed compressive means being disposable and replaceable to offset wear during advancement of said film units therebetween and possible fouling by any escape of said processing liquid, said fixed compressive means being elongated and its central portion of greater diameter than other portions which diminish continuously in diameter toward its extremities, biasing means adapted to bear against said translationally movable compressive means and urge it toward said fixed compressive means, and complementary positioning and latching means mounted for mutual engagement on said magazine and camera for holding each in removable engagement with the other.

17. Photographic apparatus for incorporation with a camera for use in supplying, exposing and processing a quantity of composite film material embodying a releasably-contained processing liquid, said apparatus comprising a disposable film container having an exit aperture formed at one end thereof and removably attachable to open rear portions of said camera for providing a complete closure thereof, and for supplying said film material, positioning it at a focal plane and enabling its advancement therefrom laterally through said aperture for processing purposes, said container when attached to said camera forming an effectively integral continuous outer housing portion of the latter, a pair of disposable compressive means identified with said container and located adjacent to said aperture thereof, at least one of said compressive means being integral with said container so as to be fixed, the other compressive means being translationally movable toward and away from said fixed means, biasing means mounted within said camera so as to bear against said movable compressive means and urge it toward said fixed compressive means, and complementary interconnecting positioning and latching means mounted on said container and camera, respectively, for holding each in removable engagement with the other.

18. Photographic apparatus for incorporation with a camera for use in supplying, exposing and processing a quantity of composite film material embodying a releasably-contained processing liquid, said apparatus comprising a disposable film container having an exit aperture formed at one end thereof removably attachable to an open rear face of said camera for providing a complete closure thereof, and for supplying said film material, positioning it at a focal palne and enabling its advancement therefrom for processing purposes, said container when attached to said camera forming an effectively integral continuous external housing portion of the latter, a first fixed disposable compressive means of a given form mounted on said container adjacent to said aperture thereof, a second non-disposable translationally-movable compressive means of a given form mounted on said camera so as to be aligned with said fixed compressive means when said container is mounted on said camera, biasing means for bearing against and urging said movable compressive means toward said fixed compressive means and complementary interconnecting positioning and latching means mounted partially on said container and partially on said camera for holding each in removable engagement with the other to form said continuous external housing portion.

19. Photographic apparatus for incorporation with a camera for use in supplying, exposing and processing a quantity of composite film material embodying a releasably-contained processing liquid, said apparatus comprising a disposable film container having an exit aperture formed at one end thereof removably attachable to open rear portions of said camera for providing a complete closure thereof and for supplying said film material, positioning it at a focal plane and enabling its advancement therefrom for processing purposes, said container when attached to said camera forming an effectively integral continuous outer wall portion of the camera housing, a first fixed compressive means of a given form untiary with said container and located adjacent to said aperture, a second non-disposable translationally-movable compressive means of a given form so mounted on said camera as to be positioned adjacent to said fixed compressive means when said container is mounted on said camera, and complementary interconnecting positioning and latching means mounted in part on said container and in part on said camera for holding each in releasable engagement with the other thereby automatically positioning said first and second compressive means together in correct compressive alignment and forming said integral continuous housing portion.

References Cited

UNITED STATES PATENTS

| | | | |
|---|---|---|---|
| 2,624,253 | 1/1953 | Fairbank | 95—89 |
| 3,350,990 | 11/1967 | Finelli et al. | 95—19 X |

NORTON ANSHER, Primary Examiner

C. B. FUNK, Assistant Examiner

U.S. Cl. X.R.

95—19